US010819876B2

(12) United States Patent
Pangasa et al.

(10) Patent No.: US 10,819,876 B2
(45) Date of Patent: Oct. 27, 2020

(54) VIDEO-BASED DOCUMENT SCANNING

(71) Applicant: ADOBE INC., San Jose, CA (US)

(72) Inventors: Ankit Pangasa, Rohini (IN); Abhishek Shah, Pitam Pura (IN)

(73) Assignee: ADOBE INC., San Jose, CA (US)

( * ) Notice: Subject to any disclaimer, the term of this patent is extended or adjusted under 35 U.S.C. 154(b) by 225 days.

(21) Appl. No.: 16/017,756

(22) Filed: Jun. 25, 2018

(65) Prior Publication Data
US 2019/0394350 A1    Dec. 26, 2019

(51) Int. Cl.
*H04N 1/195*    (2006.01)
*G06K 9/00*    (2006.01)
*G06K 9/62*    (2006.01)
*G06T 7/246*    (2017.01)
*G06T 7/00*    (2017.01)

(52) U.S. Cl.
CPC ..... *H04N 1/19594* (2013.01); *G06K 9/00463* (2013.01); *G06K 9/00744* (2013.01); *G06K 9/00765* (2013.01); *G06K 9/6268* (2013.01); *G06T 7/246* (2017.01); *G06T 7/97* (2017.01); *G06K 2209/01* (2013.01); *H04N 2201/0084* (2013.01); *H04N 2201/0434* (2013.01)

(58) Field of Classification Search
None
See application file for complete search history.

(56) References Cited

U.S. PATENT DOCUMENTS

| 7,075,581 B1 * | 7/2006 | Ozgen | G11B 27/034 348/441 |
|---|---|---|---|
| 9,191,554 B1 * | 11/2015 | Manohar | H04N 5/14 |
| 2002/0028026 A1 * | 3/2002 | Chen | G06T 3/4053 382/284 |
| 2009/0080853 A1 * | 3/2009 | Chen | G11B 27/28 386/241 |
| 2011/0182471 A1 * | 7/2011 | Reznik | G06F 3/017 382/103 |
| 2011/0299136 A1 * | 12/2011 | Kubo | G06K 9/3208 358/474 |
| 2013/0250371 A1 * | 9/2013 | Verhaegh | H04N 1/3876 358/406 |
| 2013/0250379 A1 * | 9/2013 | Rigazio | H04N 1/19594 358/538 |

(Continued)

OTHER PUBLICATIONS

W. Tariq and N. Khan, "Click-Free, Video-Based Document Capture— Methodology and Evaluation," 2017 14th IAPR International Conference on Document Analysis and Recognition (ICDAR), Kyoto, Nov. 9, 2017, pp. 21-26. (Year: 2017).*

*Primary Examiner* — Kim Y Vu
*Assistant Examiner* — Nathan J Bloom
(74) *Attorney, Agent, or Firm* — Shook, Hardy & Bacon L.L.P.

(57) ABSTRACT

Technologies for video-based document scanning are disclosed. The video scanning system may divide a video into segments. A segment has frames with a common feature. For a segment, the video scanning system is configured to rank the frames in the segment, e.g., based on motion characteristics, zoom characteristics, aesthetics characteristics, quality characteristics, etc., of the frames. Accordingly, the system can generate a scan from a selected frame in a segment, e.g., based on the rank of the selected frame in the segment.

20 Claims, 5 Drawing Sheets

(56) References Cited

U.S. PATENT DOCUMENTS

| | | | |
|---|---|---|---|
| 2014/0152849 A1* | 6/2014 | Bala | G06T 3/4092 |
| | | | 348/207.1 |
| 2014/0240799 A1* | 8/2014 | Sakai | H04N 1/047 |
| | | | 358/488 |
| 2015/0054975 A1* | 2/2015 | Emmett | H04N 5/23245 |
| | | | 348/220.1 |
| 2015/0188757 A1* | 7/2015 | Amidei | H04W 4/21 |
| | | | 709/217 |
| 2016/0055196 A1* | 2/2016 | Collins | G06F 40/197 |
| | | | 707/690 |
| 2017/0078501 A1* | 3/2017 | Chang | G06F 3/1292 |
| 2017/0201745 A1* | 7/2017 | Abramov | G06T 7/0002 |

\* cited by examiner

VIDEO-BASED DOCUMENT SCANNING

BACKGROUND

Document scanning has long been used to capture and create electronic copies of documents, such as receipts, brochures, articles, business cards, forms, etc. Conventionally, scanners are used to capture and create such electronic copies. Advanced scanners may have a document feeder mode that allows users to feed multiple documents or pages into the scanner. Subsequently, a single document containing all the scanned pages may be created. However, the document feeder mode is only viable when all pages are similar in size. The accuracy of the scanner goes down considerably when pages of different sizes are fed into the scanner. Further, the portability and mobility of scanners are low.

With the growing popularity of mobile devices (e.g., smartphones) with cameras, there has been an increasing trend of using mobile devices to capture documents. Currently, there are some applications that are capable of converting camera images into portable document format (PDF) documents. However, these applications fail to efficiently capture and convert multiple images into a single PDF document. Instead, these applications require a user to individually capture each image, sometimes even with multiple shots. As such, to generate a single document from multiple images can be very time consuming and error-prone.

SUMMARY

Embodiments of the present disclosure relate to systems and methods for video-based document scanning to automatically and intelligently generate an electronic document having multiple pages. In this regard, a video scan can be performed in association with multiple pages and, thereafter, assessed and used to generate a single document. To identify representative frames in a video for each unique page captured in the video scan, embodiments of the present disclosure relate to performing various assessments of video frames based on various characteristics of the video frames, e.g., motion characteristics, zoom characteristics, aesthetics characteristics, or quality characteristics. As described in embodiments herein, technical solutions are provided to automatically select a video frame and convert it to a scan.

In one embodiment, the system divides a video into segments, e.g., based on scene changes. For a segment, the system is configured to rank frames in the segment, e.g., based on motion characteristics of a common feature in the segment. Subsequently, the system can generate a scan of a selected frame based on the rank of the selected frame.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

People use smartphones to capture images of documents. Conventionally, smartphones with applications, such as AdobeScan® and CamScanner®, can convert images into PDF documents. However, these applications generally require a user to capture all the documents or pages individually by taking multiple camera shots. The user has to manually ensure the quality of each shot, and re-shoot the image until each captured image is satisfactory. Finally, upon obtaining well-captured images, the individual captured images can be merged into a single document. This traditional process can be tedious and error-prone. User interventions are often required at multiple steps, and the resulting documents often have inconsistent quality.

This disclosure addresses a technical solution for video-based document scanning. A user can create a video by capturing multiple pages, e.g., using a smartphone. In this regard, a video scan can be created to capture many pages that a user desires to convert to an electronic document. Such a video scan can then be assessed and used to generate a single electronic document (e.g., PDF) having each of the pages captured in the video. To generate a quality electronic document, the video scan can be assessed to identify the unique pages present in the video scan. Upon identifying unique pages, the representative frames can be identified for each page and used to generate a single, high-quality electronic document. In operation, to identify unique pages present in the video scan, the disclosed video scanning system can identify scene changes in the video and subsequently divide the video into segments. As will be discussed in further detail below, a segment may include frames corresponding to a common feature, such as a common page.

To identify or select representative frames for use in generating the single electronic document, the disclosed video scanning system can determine feature points in each frame and associate the feature points with their coordinates in their respective frames. As will be discussed in further detail below, the motion characteristics of respective frames may be determined based on respective displacements of the feature points between two frames. Accordingly, one or more frames may be selected from the segments, e.g., based on the moving speed or the displacement of the feature points. At least one frame of the segment may be converted into a scan to represent the document in the segment. Respective scans from multiple segments may be merged to create a single file, e.g., as a PDF file, with multiple pages.

In various embodiments, in addition to motion characteristics, zoom characteristics, aesthetics characteristics, quality characteristics, or other characteristics may also be used to assess frames in a segment and rank frames accordingly. In various embodiments, a weighted score may be generated for a frame based on different characteristics of the frame. The respective weights for different characteristics may be manually set by a user or automatically determined via machines learning.

Aspects of the technology disclosed herein provide a number of advantages over conventional scanning methods. Previous approaches required a user to capture images of individual documents separately while also manually determining the quality of each image to be scanned. Such manual quality checks lead to inconsistent results due, in part, to human error. Further, the traditional approach is time consuming as it requires the user to perform a quality check for each captured image, which is undesirable for scanning a large set of documents. The technology disclosed herein automatically and intelligently identifies unique pages present in a video and identifies a highly ranked frame for each individual document or page present in the video to create the best quality scans. Accordingly, the technology disclosed herein produces scans in a consistent and efficient manner, even over many different documents with different sizes captured in a video.

The subject matter of the present disclosure is described with specificity herein to meet statutory requirements. However, the description itself is not intended to limit the scope of this patent. Rather, it is contemplated that the claimed subject matter also might be embodied in other ways, to include different steps or combinations of steps similar to the ones described in this document, in conjunction with other present and/or future technologies.

Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied when one or more features are present. Also, the term "or" includes the conjunctive, the disjunctive and both (a or b thus includes either a or b, as well as a and b).

Figure 1:
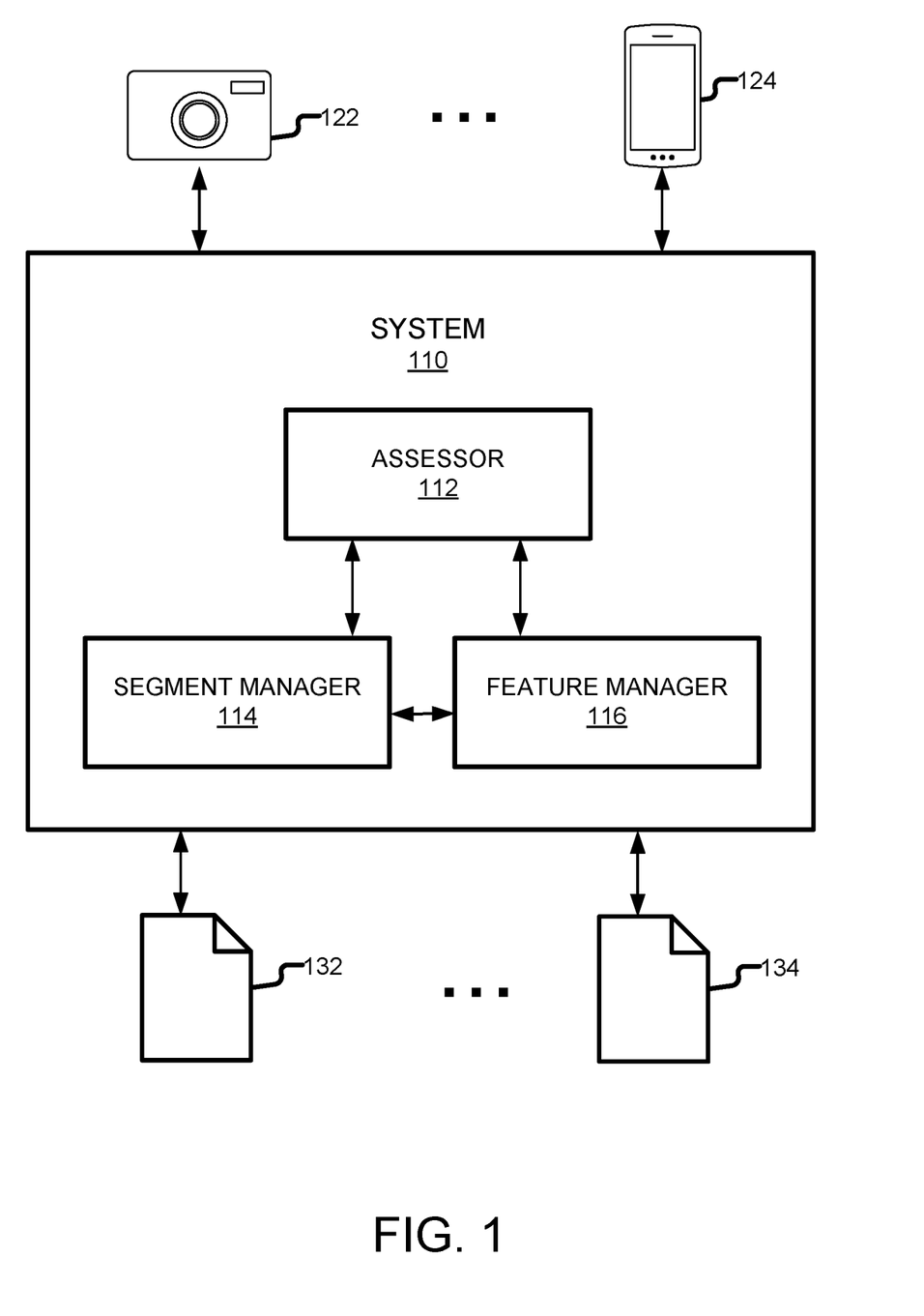
FIG. 1 is a schematic diagram illustrating an example implementation of a video scanning system, incorporating aspects of the present disclosure, in accordance with one embodiment.

Referring now to FIG. 1, a schematic diagram illustrates an example implementation of a video scanning system, which may be used to generate a single electronic file from a video scan that captures many different pages. As illustrated in FIG. 1, video scanning system 110 includes assessor 112, segment manager 114, and feature manager 116, operatively coupled with each other. In accordance with various embodiments, system 110 receives video scans from camera 122 or mobile device 124, and generates various scans (e.g., scan 132 and scan 134). In some embodiments, scan 132 is a single electronic document with multiple pages. In some embodiments, scan 134 includes multiple documents.

In some embodiments, system 110 is a server computing device or service, such as a server in or a service provided by a computing cloud, and interacts with various digitization devices and user devices. In alternative embodiments, system 110 can be integrated with a user computing device, such as mobile device 124, or any other types of devices. In various embodiments, system 110 receives videos via an application programming interface (API) or user interface, e.g., uploaded by a user.

In some embodiments, system 110 is embodied as a specialized computing device. In some embodiments, system 110 can be embodied, for example, as an application, a mobile application, or an online computing service. In some embodiments, system 110 can be a distributed system, for example, each of assessor 112, segment manager 114, and feature manager 116 can be distributed across any number of servers. Regardless of the computing platform on which system 110 is implemented, system 110 can be embodied as a hardware component, a software component, or any combination thereof for video-based document scanning.

Continuing with system 110, in various embodiments, segment manager 114 is configured to identify video segments and/or divide a video into segments, e.g., based on scene changes. In this regard, upon obtaining a video, the segment manager 114 can assess the video to identify video segments in association therewith. A video segment generally refers to a set of consecutive frames sharing a common property, such as relating to the same page captured in the video. By dividing a video into separate video segments, unique pages captured in the video may be compartmentalized. In some embodiments, a video segment will correspond to a unique page captured in the video.

Segment manager 114 may identify video segments in any number of ways, for example, based on scene changes. In this regard, in some implementations, the segment manager 114 can detect a scene change based on an appearance of a new feature or a disappearance of an existing feature on the video. By way of example, when there are multiple pages captured in the video, a new page may gradually appear in the video, e.g., from a partial view to a full view of the new document. Conversely, an existing page may gradually move out of the video, e.g., from a full view to a partial view, then eventually completely out of the view. Consequently, a new page will bring in new features to the video. Conversely, existing features will disappear along with the exit of the existing page. Upon identifying different segments, segment manager 114 can segment the video such that each segment contains different content. The resulting video segments may now each contain different content, such as different pages.

Segment manager 114 may divide a video into segments based on feature changes detected by feature manager 116, such as an appearance of a new feature or a disappearance of an existing feature on the video. In another embodiment, segment manager 114 may also directly associate a set of frames in the video together, e.g., based on one or more common features shared by the set of frames. Continuing with the same example discussed above, segment manager 114 may associate all consecutive frames having the same logo together.

Features can be identified, for example, by feature manager 116. Feature manager 116 is configured to identify and track features in frames. A feature is an interesting part of a frame. Feature manager 116 may detect high-level features, such as different foreground objects. Feature manager 116 may also detect low-level features, such as edges, corners, blobs, ridges, etc. Features in different frames may be related to each other if they share some characteristics, such as color, form, motion, etc. Accordingly, feature manager 116 can track features in the video, e.g., to detect whether one or more same features are repeated in two or more frames in the same scene. For example, a business letter has a company logo. The logo forms a distinguishing feature of the document. Feature manager 116 can track all frames having the same logo as well as their respective positions and sizes in different frames.

Assessor 112 assesses various characteristics of frames, including motion characteristics, zoom characteristics, aesthetics characteristics, quality characteristics, etc. As an example, assessor 112 may determine respective motion of a common feature in a group of frames. The common feature may have one or more feature points. The motion of the common feature may be measured based on a sum of respective displacements of the one or more feature points over two frames. As another example, assessor 112 may detect a zoom-in or zoom-out operation based at least in part on a change of respective sizes of the common feature in two frames. As yet another example, assessor 112 may detect aesthetic characteristics of the frames, such as depth of field or color vividness. As another example, assessor 112 may detect quality characteristics of the frames, such as shakiness, brightness, contrast. In some embodiments, assessor 112 has separate components to assess different characteristics of frames, which will be discussed in more details in connection with FIG. 2. In some embodiments, assessor 112 may determine a weighted score of a frame based on various measurements of different characteristics of the frame.

Based on the assessment from assessor 112, system 110 can select a frame to best represent the document captured in the video, and transform the frame into a scan, such as scan 132 or scan 134. Scan 132 may be a PDF file with just one page based on one frame. Scan 134 may be a PDF file with multiple pages based on representative frames from respective segments.

In various embodiments, system 110 may select the representative frame based at least in part on displacement of one or more feature points of the representative frame. Further, system 110 may select the representative frame based at least in part on the size change of the common feature. Further, system 110 may select the representative frame based at least in part on a measurement of depth of field or color vividness of the representative frame. Further, system 110 may select the representative frame based at least in part on a measurement of shakiness, brightness, or contrast of the representative frame. Further, system 110 may select the representative frame based at least in part on an amount of text recognized in the representative frame. In other embodiments, system 110 may select the representative frame based at least in part on other characteristics associated with the representative frame.

In some embodiments, video scanning system 110 can be implemented differently than that depicted in FIG. 1. As an example, new components, such as a selector or a converter, may be added to system 110. The selector may select one or more representative frames from a segment based on the assessment provided by assessor 112. The converter may convert a representative frame into a scan. For example, the converter may use an Adobe Acrobat Distiller® to convert an image to Adobe PDF. As another example, segment manager 114 can be combined with feature manager 116 to form a comprehensive engine. As yet another example, assessor 112 may be divided into many special assessors, such as that depicted in FIG. 2.

In some embodiments, components depicted in FIG. 1 may have a direct or indirect connection not shown in FIG. 1. In this way, the components depicted in FIG. 1 can be connected in any number of ways and are not limited to the connections illustrated in FIG. 1. In some embodiments, some of the components depicted in FIG. 1 are divided into multiple components. Further, one or more components of video scanning system 110 can be located across any number of different devices and/or networks. As an example, assessor 112 can be implemented as an independent component in a computing cloud.

Figure 2:
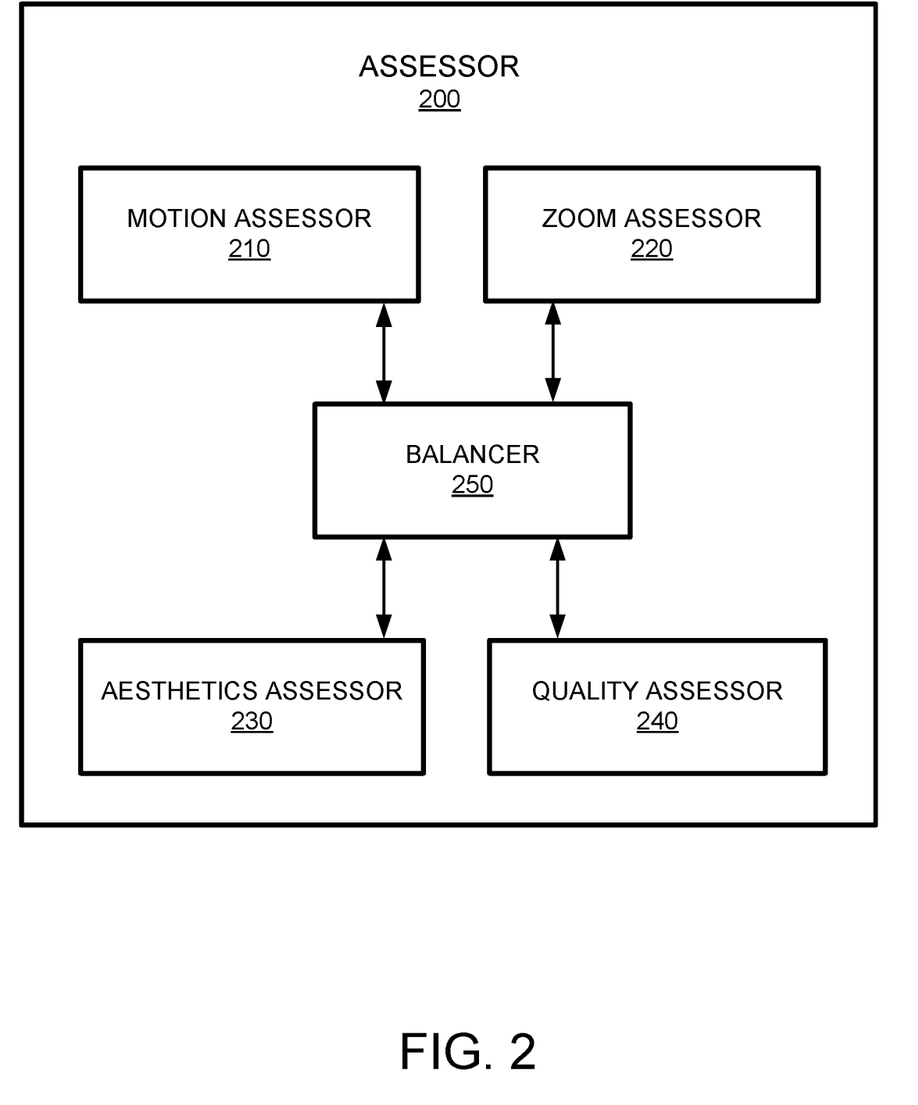
FIG. 2 is a schematic diagram illustrating an example implementation of an assessor in the video scanning system, incorporating aspects of the present disclosure, in accordance with one embodiment.

FIG. 2 is a schematic diagram illustrating an example implementation of an assessor in the video scanning system, in accordance with an embodiment of the present disclosure. In this embodiment, assessor 200 includes motion assessor 210, zoom assessor 220, aesthetics assessor 230, quality assessor 240, and balancer 250, operatively coupled with each other.

Motion assessor 210 is configured to assess motion characteristics of one or more features in a frame. Motion characteristics may include the speed of one or more feature points of a feature. In various embodiments, motion assessor 210 may generate a score for a frame based on its motion characteristics, such as a displacement of a feature point in two frames. In general, a frame with fast moving features is likely to be blurry or even distorted, which is not a good candidate to be converted into a scan of the document captured in the video. Instead, a frame with low motion features or relatively still features is more desirable.

To assess motion characteristics, feature points of the common feature can be identified and tracked over consecutive frames. The feature points of a common feature can be identified and tracked over consecutive frames. In one embodiment, a first frame ($f_1$) and a second frame ($f_2$) can contain common feature points labelled as $fp_1$, $fp_2$, etc. Further, assume the coordinates of these feature points in $f_1$ are denoted by $p_{11}$, $p_{12}$, etc. Similarly, assume the coordinates of these feature points in $f_2$ are denoted by $p_{21}$, $p_{22}$, etc. Then, for the transition from $f_1$ to $f_2$, let $d_1$, $d_2$, etc. denote respective displacements ($d_1$, $d_2$, etc.) among respective pairs of coordinates, e.g., between $p_{11}$ and $p_{21}$, or between $p_{12}$ and $p_{22}$, etc. Further, let D denote the total displacement of all feature points. Thus, D is the sum of $d_1$, $d_2$, etc.

Using the above information, motion assessor 210 can assign D as the total displacement of common feature points for frame $f_2$. Let p denote the count of feature points. By the same token, motion assessor 210 can also assign (D/p) as the average displacement of common feature points for frame $f_2$.

For every pair of consecutive frames, the total displacement of common feature points and/or the average displacement of common feature points may be determined as discussed above. Now assume there be (n) frames and (m) common feature points in a segment. Let the total displacement of common feature points in consecutive frames denote as $td_{1\_2}$, $t_{2\_3}$, $td_{3\_4}$, etc. Let the average displacement of common feature points in consecutive frames denote as $ad_{1\_2}$, $ad_{2\_3}$, $ad_{3\_4}$, etc. Subsequently, the average speed (AS) of the feature points in the entire segment may be obtained either by Eq. 1 or Eq. 2 in different embodiments, where each frame also represents a unit time.

$$AS = (\Sigma_{k=1}^{n-1} td_{k\_k+1})/m/n \qquad \text{(Eq. 1)}$$

$$AS = (\Sigma_{k=1}^{n-1} ad_{k\_k+1})/n \qquad \text{(Eq. 2)}$$

In some embodiments, motion assessor 210 may generate a motion score ($S_1$) for a frame ($F_k$) to be negatively correlated to the total displacement of common feature points between two frames of $F_{k-1}$ and $F_k$, such as based on Eq. 3, by normalizing the motion scores between 0 and 1. Other correlation methods may also be used for different embodiments.

$$S_{1\_k} = 1 - \frac{td_{k-1\_k} - td_{min}}{td_{max} - td_{min}} \qquad \text{(Eq. 3)}$$

In some embodiments, motion assessor 210 may generate another motion score ($S_1$) for a frame ($F_k$) to be negatively correlated to the average displacement of common feature points between two frames of $F_{k-1}$ and $F_k$, such as based on Eq. 4, by normalizing the motion scores between 0 and 1.

$$S_{1\_k} = 1 - \frac{ad_{k-1\_k} - ad_{min}}{ad_{max} - ad_{min}} \quad \text{(Eq. 4)}$$

Further, based on the average speed of the feature points in the entire segment, e.g., based on Eq. 1 or Eq. 2, motion assessor 210 may also sort frames into different categories, e.g., based on the difference between the speed of the feature points in a particular frame and the average speed of the feature points in the entire segment. In short, if a frame lies within a low motion category, then its likelihood of having high focus and less distortions is high.

Zoom assessor 220 is to assess zoom characteristics of a frame. Sometimes, a user may try to zoom in or zoom out over objects to get the best shot possible. Accordingly, zoom assessor 220 may try to determine whether there is a zoom in or zoom out operation in a video. Subsequently, zoom assessor 220 can assign a zoom score ($S_2$) to a frame based on the zoom in or zoom out operation.

In various embodiments, zoom assessor 220 detects a zoom operation based on a change of the size of a common feature in two or more frames. By way of example, by tracking the absolute size or relative size of the common feature between two frames or more often among a set of consecutive frames, zoom assessor 220 can determine whether the set of frames represent a zoom-in operation or a zoom-out operation. In one embodiment, zoom assessor 220 measures the ratio of the area of the common feature over the whole area of the frame. If the ratio increases, it implies a zoom-in operation. Conversely, if the ratio decreases, it implies a zoom-out operation. Heuristically, the user will stop the zoom operation when an optimal zoom level is achieved. Accordingly, zoom assessor 220 may determine the zoom score ($S_2$) for a frame to be positively correlated to a degree of the zoom operation. For example, for a zoom-in or zoom-out operation, a higher zoom score ($S_2$) may be assigned according to a higher degree of zoom-in or zoom-out level. In various embodiments, the zoom score ($S_2$) may be normalized into a scale between 0 and 1.

Aesthetics assessor 230 is configured to assess aesthetics characteristics of a frame. In various embodiments, aesthetics characteristics include balancing elements, color harmony, interesting content, depth of field, interesting light, object emphasis, repetition, rule of thirds, symmetry, vivid color, etc. In one embodiment, aesthetics assessor 230 uses machine learning based on Adobe's Image Aesthetics Library to find an aesthetics score ($S_3$) for each frame. In various embodiments, the aesthetics score ($S_3$) may be normalized into a scale between 0 and 1. In one embodiment, aesthetics assessor 230 sorts the frames into different groups based on their aesthetics characteristics, then assign discrete aesthetics scores to each group, such as assign 1, 0.5, and 0 to Good, Medium, and Low aesthetics groups, respectively.

Quality assessor 240 is configured to assess quality characteristics of a frame. In various embodiments, quality characteristics include blur, shake, brightness, contrast, etc. In some embodiments, a higher quality score ($S_4$) may be assigned to a frame with lesser shakiness or blur, better brightness or contrast. In various embodiments, the quality score ($S_4$) may be normalized into a scale between 0 and 1.

Balancer 250 is generally configured to form an overall assessment based on motion score ($S_1$) determined by motion assessor 210, zoom score ($S_2$) determined by zoom assessor 220, aesthetics score ($S_3$) determined by aesthetics assessor 230, quality score ($S_4$) determined by quality assessor 240, and other scores determined based on other characteristics of the frames. As can be appreciated, in some embodiments, not all the individual assessments from the individual assessors discussed herein will be utilized or utilized equally. By way of example, some use cases may use motion characteristics only for assessment while other use cases may use zoom characteristics only for assessment or any other combination of characteristics discussed herein. Further, as can be appreciated, various characteristics of a frame might be differentiated, or weighted differently, for different embodiments of video scanning. For example, some embodiments may assign more weight to motion characteristics while others may assign more weight to zoom characteristics.

In this regard, in some embodiments, balancer 250 may allow users to assign priority to different assessors by specifying respective weights to different assessors. Accordingly, balancer 250 can aggregate different scores (e.g., $S_1$, $S_2$, $S_3$, $S_4$, etc.) from respective assessors based on the user's priority or the weights assigned to respective assessors. In other embodiments, balancer 250 may automatically determine respective weights for different assessors. For example, balancer 250 may train a neural network to assign weights to $S_1$, $S_2$, $S_3$, $S_4$, etc. based on user feedback, such as user specified weights in relation to various characteristics.

In some embodiments, balancer 250 ranks the frames in a segment based on their weighted scores. In some embodiments, one or more top-ranked frames will be used to perform an optical character recognition (OCR). For each frame, the amount of text recognized via OCR may be calculated. In general, more text recognized via OCR indicates higher suitability of the frame to be converted into a scan. Accordingly, a representative frame of a segment may be selected based at least in part on the amount of text recognized in the frame. Further, in some embodiments, the text recognized via OCR may also be used to validate and remove duplicates from different segments. Resultantly, high quality and unique frames from different segments, which represents unique documents captured by the video, may be presented to the user for any final review or automatically converted to a scan, such as a PDF file with multiple pages.

Figure 3:
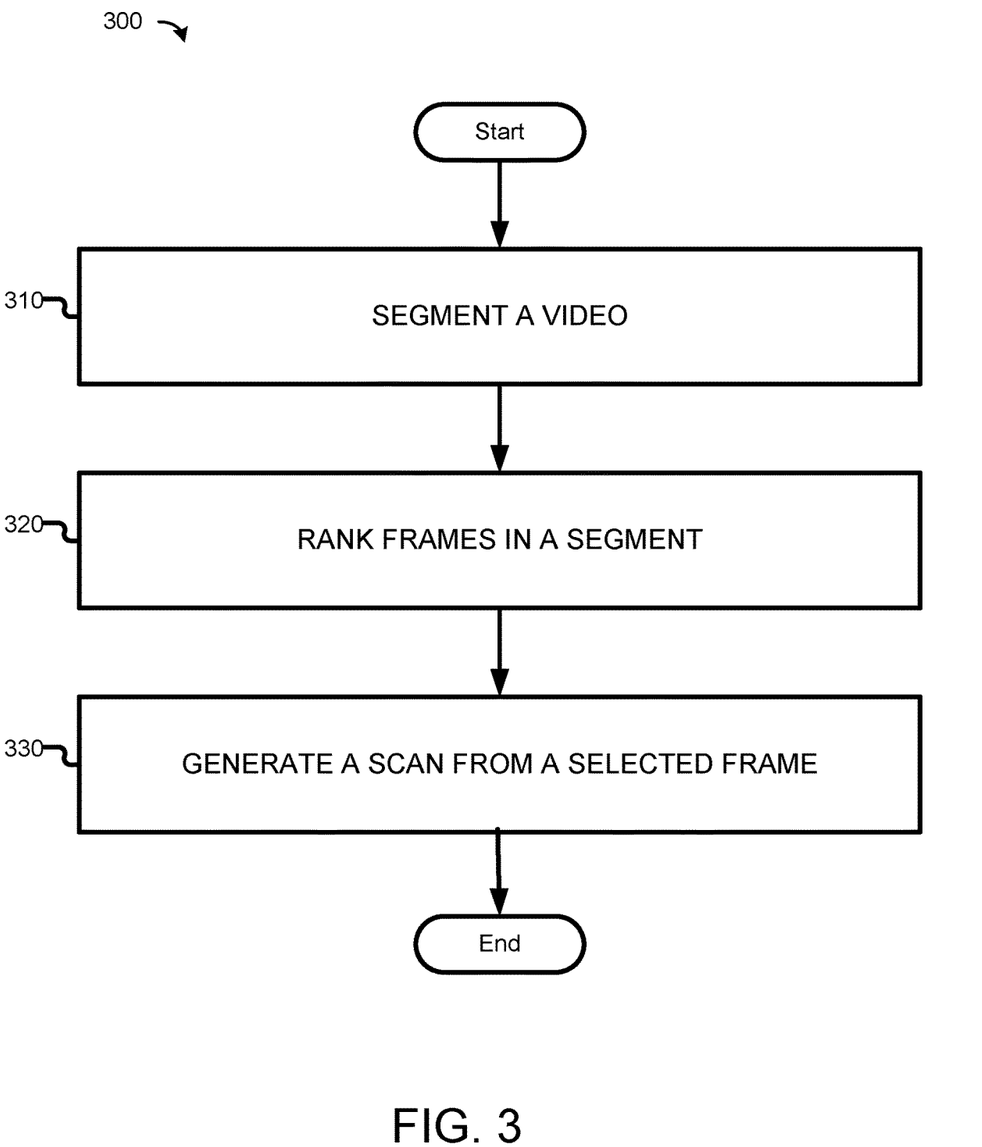
FIG. 3 is a flow diagram of an example process for video scanning, incorporating aspects of the present disclosure, in accordance with one embodiment.

FIG. 3 is a flow diagram of an example process for video scanning, incorporating aspects of the present disclosure. Process 300 can be performed, for example, by a video scanning system, such as system 110 of FIG. 1. Process 300 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to generate scans from a video. It will also be appreciated that, in various embodiments, process 300 can have fewer or additional operations than those depicted, or perform some of the depicted operations in a different order without departing from the scope of this disclosure.

At block 310, the video is segmented, e.g., by segment manager 114 of FIG. 1. The video may be segmented into at least two segments based at least in part on a scene change between the at least two segments. The scene change between the at least two segments may be detected by an appearance of a new feature or a disappearance of an existing feature on the video.

In some embodiments, a segment may be formed by associating a set of frames in the video based at least in part on a common feature, such as a common document, a common area of the document, or any common feature of the document, as described above in connection with FIG. 1. Each resulting segment generally includes one particular scene or page.

At block 320, the frames of a segment are ranked, e.g., by assessor 112 of FIG. 1 or assessor 200 of FIG. 2. To determine respective ranks of the frames in a segment, various scores corresponding to different characteristics of a frame may be generated. The rank may be based on a weighted score based on various characteristics associated with the frame as discussed in more details in connection with FIG. 4.

In one embodiment, frames are ranked based at least in part on motion characteristics of a common feature in the frames. The motion characteristics include a moving speed of a feature point of the common feature or a displacement of the feature point in two frames. Such ranks may be negatively correlated to the moving speed of the feature point or the displacement of the feature point. In general, the frame with the slowest moving feature points is ranked the highest, and the frame with the fastest moving feature point is ranked the lowest. In this way, the highly ranked image will have better focus and low distortions.

In one embodiment, frames are ranked based at least in part on zoom characteristics associated with the frames. A frame may be associated with a zoom-in or zoom-out operation. Such ranks may be positively correlated to a degree of the zoom-in or the zoom-out operation.

In one embodiment, frames are ranked based at least in part on text recognized in an OCR operation, as discussed above in connection to FIG. 2. Such ranks may be positively correlated to an amount of text recognized in the OCR operation.

The ranking process may involve multiple operations, such as assessing the frames for various characteristics and generating weighted scores. It will be appreciated that the weights assigned to different aspects of characteristics may be varied, and not all characteristics need to be weighed in for every implementation.

Next, at block 330, a scan is generated from a selected frame, e.g., by system 110 of FIG. 1. In various embodiments, at least one frame from each segment is selected based on their ranks as discussed in block 320. In various embodiments, at least one frame from each segment is selected to represent respective segments, e.g., based on a weighted score of at least two types of characteristics of the frame, such as motion characteristics and zoom characteristics as discussed above. The selected frames may be converted into respective scans or merged into a single scan, such as a PDF file with multiple pages.

Figure 4:
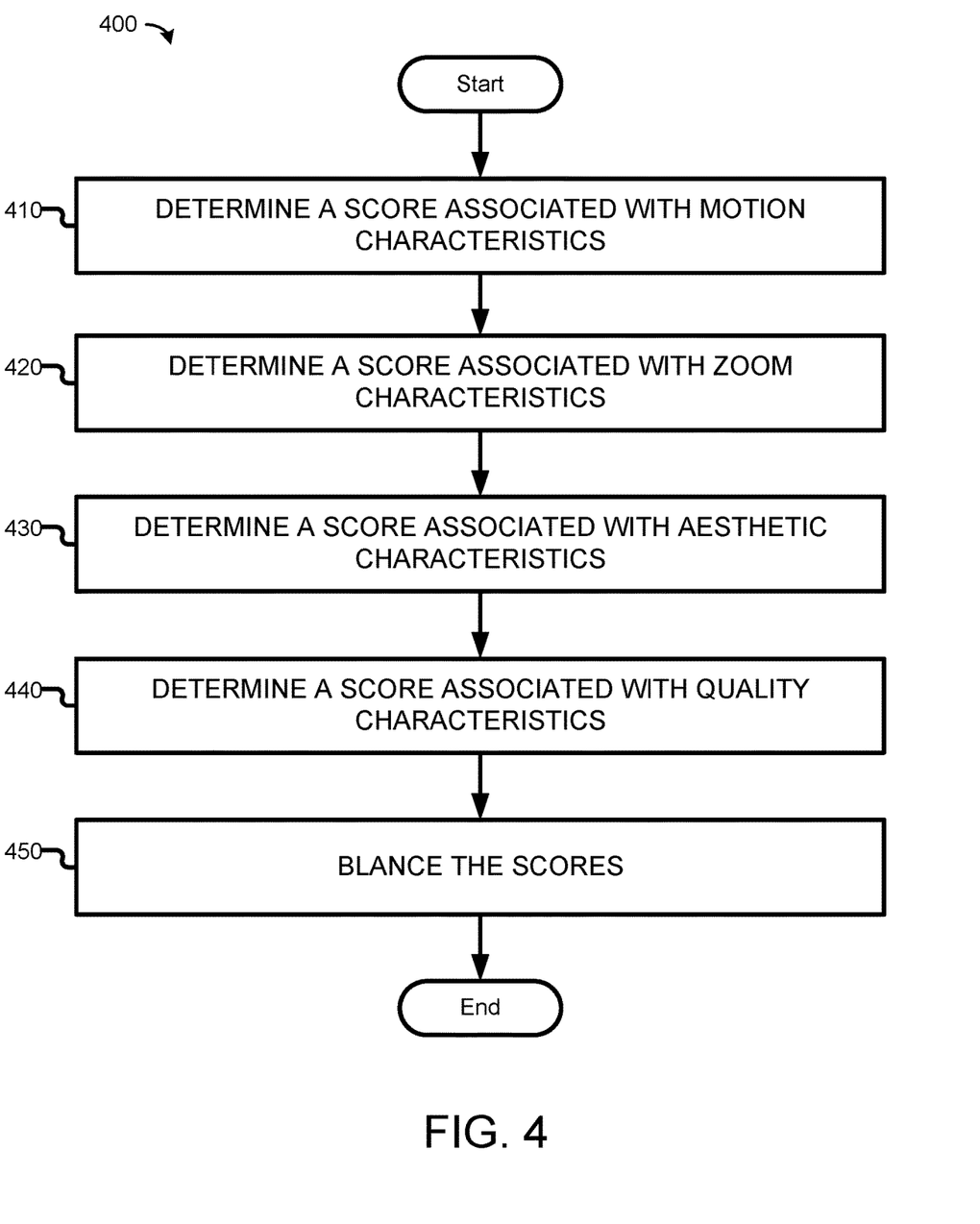
FIG. 4 is a flow diagram of an example process for assessing scores for a frame, incorporating aspects of the present disclosure, in accordance with one embodiment.

Referring now to FIG. 4, a flow diagram of an example process 400 for assessing scores for a frame is illustrated. As shown, process 400 can be performed by a video scanning system, e.g., system 110 of FIG. 1, to implement one or more embodiments of the present disclosure. Similar to process 300, in various embodiments, process 400 may have fewer or additional operations, or perform some of the operations in a different order.

At block 410, a first score (S1) associated with motion characteristics may be determined, e.g., by motion assessor 210 of FIG. 2. The frames in a segment share at least one common feature. In some embodiments, the common feature includes at least one feature point. The score associated with motion characteristics may be determined to be negatively correlated to respective moving speeds or displacement of the feature point in each frame.

In some embodiments, at least two feature points of the common feature are used. An average speed or displacement of the at least two feature points may be determined. The score associated with motion characteristics may be determined based at least in part on a difference between the average speed/displacement and a speed/displacement of the at least two feature points related to the frame, such as shown in Eq. 3 and Eq. 4 above. This is advantageous so that slower frames are ranked higher than the faster moving ones such that the higher scored frames have better focus and less distortions.

At block 420, a second score (S2) associated with zoom characteristics may be determined, e.g., by zoom assessor 220 of FIG. 2. For a set of consecutive frames, a zoom-in or zoom-out operation may be detected based on changes of the size of a common feature. The score associated with zoom characteristics may be determined to be positively correlated to a degree of the zoom-in operation or the zoom-out operation, as discussed above in connection to FIG. 2. High scores associated with zoom characteristics indicate a document size desired by the user.

At block 430, a third score (S3) associated with aesthetic characteristics may be determined, e.g., by aesthetics assessor 230 of FIG. 2. The score associated with aesthetics characteristics for a frame may be determined to be positively correlated to an aesthetics measurement of the frame. This determines a sense of quality of content within each frame.

At block 440, a fourth score (S4) associated with quality characteristics may be determined, e.g., by quality assessor 240 of FIG. 2. Quality characteristics include blur, shake, brightness, contrast, etc. The score associated with quality characteristics for a frame may be determined to be positively correlated to a measurement of brightness or contrast of the frame, or negatively correlated to a measurement of blurriness or shakiness.

At block 450, various scores for a frame may be balanced, e.g., by balancer 250 of FIG. 2. In various embodiments, balancing the scores include determining a weighted score for each of the frames based on at least two scores from S1, S2, S3, and S4 as discussed above. In some embodiments, the weighted score is calculated based on all four of the scores above. Further, in some embodiments, balancing the scores includes ranking the frames based on the weighted scores of the frames. In some embodiments, a neural network can be trained to automatically assign weights to the scores S1, S2, S3, and S4 based in part on user feedback. The weights assigned to different scores of a frame may be adjusted, e.g., based on user requirements. In some embodiments, the frame with the highest weighted score is selected and will be converted into a scan to represent the document captured in the segment.

Figure 5:
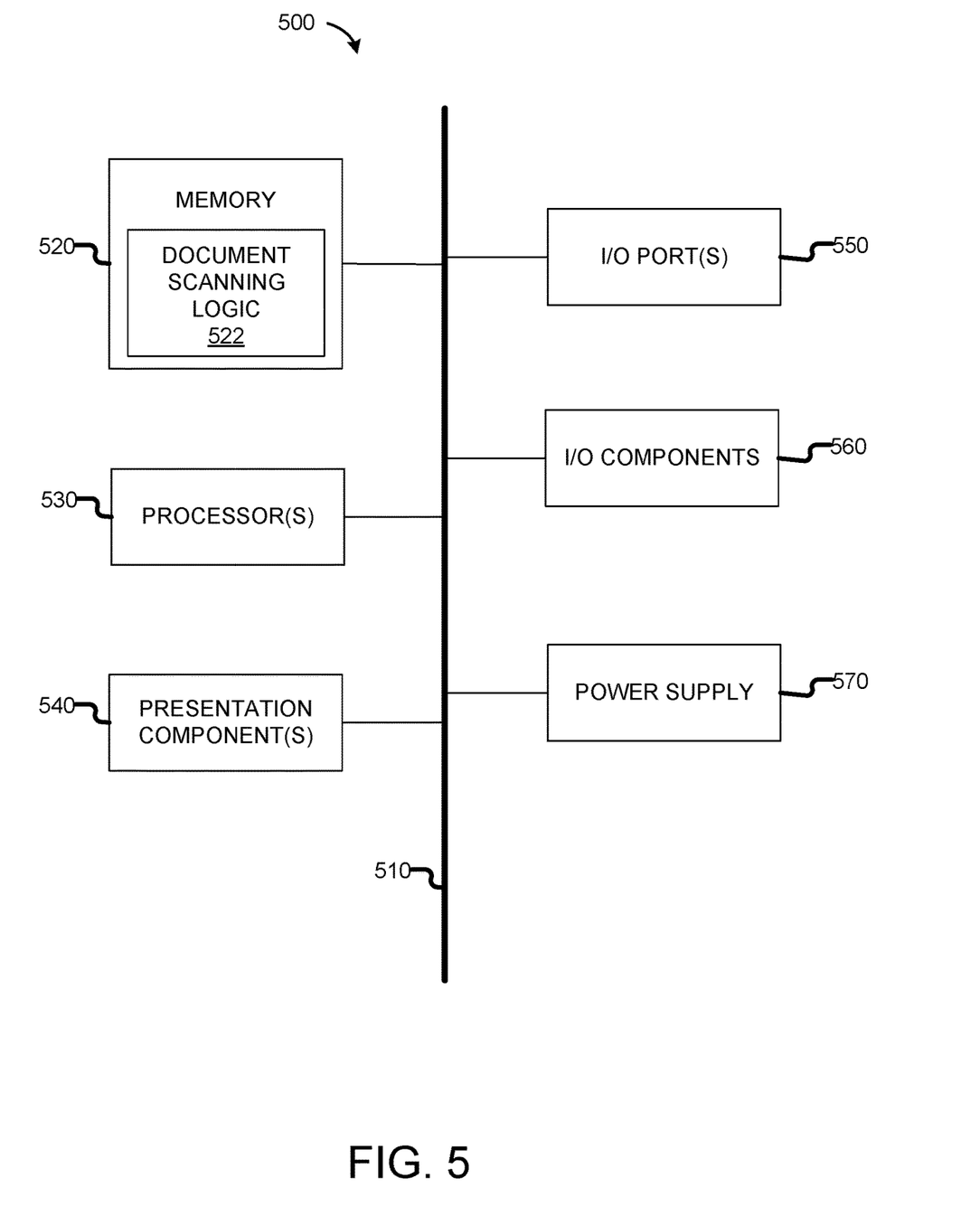
FIG. 5 illustrates an example computing device suitable for practicing the disclosed embodiments, in accordance with one embodiment.

Having briefly described an overview of embodiments of the present invention, an exemplary operating environment in which embodiments of the present invention is to be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The disclosure may be described in the general context of computer code or machine-useable instructions, including computer-executable instructions such as program modules, being executed by a computer or other machines, such as a personal data assistant or other handheld devices. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 5, computing device 500 includes a bus 510 that directly or indirectly couples the following devices: memory 520, one or more processors 530, one or more presentation components 540, input/output (I/O) ports 550, input/output (I/O) components 560, and an illustrative power supply 570. Bus 510 represents one or more busses (such as an address bus, data bus, or combination thereof). Although the various blocks of FIG. 5 are shown with lines for the sake of clarity, in reality, delineating various components is not so clear, and metaphorically, the lines would more accurately be fuzzy. For example, a presentation component such as a display device could also be considered as an I/O component. Also, processors have memory. The inventor recognizes that such is the nature of the art, and reiterates that the diagram of FIG. 5 is merely illustrative of an exemplary computing device that is used in connection with one or more embodiments of the present invention. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media may include any available media to be accessed by computing device 500, and include both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 520 includes computer storage media in the form of volatile and/or nonvolatile memory. In various embodiments, the memory is removable, non-removable, or a combination thereof. Exemplary hardware devices include solid-state memory, hard drives, optical-disc drives, etc. Computing device 500 includes one or more processors that read data from various entities such as memory 520 or I/O components 560. Presentation component(s) 540 present data indications to a user or other device. Exemplary presentation components include a display device, speaker, printing component, vibrating component, etc.

In various embodiments, memory 520 includes, in particular, temporal and persistent copies of document scanning logic 522. Document scanning logic 522 includes instructions that, when executed by one or more processors 530, result in computing device 500 to scan documents from a video, such as, but not limited to, process 300, or process 400. In various embodiments, document scanning logic 522 includes instructions that, when executed by processors 530, result in computing device 500 performing various functions associated with, but not limited to, assessor 112, segment manager 114, or feature manager 116, in connection with FIG. 1. In various embodiments, document scanning logic 522 includes instructions that, when executed by processors 530, result in computing device 500 performing various functions associated with, but not limited to, motion assessor 210, zoom assessor 220, aesthetics assessor 230, quality assessor 240, or balancer 250, in connection with FIG. 2.

In some embodiments, one or more processors 530 are to be packaged together with document scanning logic 522. In some embodiments, one or more processors 530 are to be packaged together with document scanning logic 522 to form a System in Package (SiP). In some embodiments, one or more processors 530 are integrated on the same die with document scanning logic 522. In some embodiments, processors 530 are integrated on the same die with document scanning logic 522 to form a System on Chip (SoC).

I/O ports 550 allow computing device 500 to be logically coupled to other devices including I/O components 560, some of which are built-in components. Illustrative components include a microphone, joystick, game pad, satellite dish, scanner, printer, wireless device, etc. In some embodiments, the I/O components 560 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500.

The computing device 500 may be equipped with depth cameras, such as stereoscopic camera systems, infrared camera systems, RGB camera systems, touchscreen technology, and combinations of these, for gesture detection and recognition. Additionally, the computing device 500 may be equipped with accelerometers, gyroscopes, or other sensors that enable detection of motion. The output of these sensors may be provided to the display of the computing device 500 to render immersive augmented reality or virtual reality.

As described above, implementations of the present disclosure provide systems, methods and computer storage media for scanning documents from a video. Certain illustrated embodiments hereof are shown in the drawings, e.g., FIGS. 1-4, and have been described above in detail. It should be understood, however, that there is no intention to limit the invention to the specific forms disclosed, but on the contrary, the intention is to cover all modifications, alternative constructions, and equivalents falling within the scope of the invention.

It will be understood by those of ordinary skill in the art that the order of steps shown in process 300 of FIG. 3 and process 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Some specific embodiments of the present invention have been described in relation to particular aspects, which are intended in all respects to be illustrative rather than restrictive. Alternative embodiments will become apparent to those of ordinary skill in the art to which the present invention pertains without departing from its scope. This application is intended to cover any adaptations or variations of the embodiments discussed herein. Therefore, it is manifestly intended that embodiments described herein be limited only by the claims.

What is claimed is:

1. A computer-implemented method for video based document scanning, comprising:
   receiving a video that captures a plurality of pages;
   identifying a plurality of segments of the video, each segment having a set of frames corresponding with a page of the plurality of pages, each of the set of frames including a shared feature;
   selecting a representative frame from each segment to represent a corresponding page, the representative frame being selected based on a measurement score negatively correlated to a moving speed of the shared feature at the representative frame; and
   generating a file to include information of respective video frames selected for the plurality of segments.

2. The method of claim 1, wherein identifying the plurality of segments comprises segmenting the video into at least two segments based at least in part on a scene change between the at least two segments, and wherein selecting the representative frame comprises ranking a plurality of frames in one segment based at least in part on motion of a common feature in the plurality of frames, and selecting a frame based at least in part on a rank of the frame.

3. The method of claim 2, wherein the common feature comprises at least two feature points, the method further comprising:
   computing an average speed of the at least two feature points across the plurality of frames; and
   determining a first score for the frame of the plurality of frames based at least in part on a difference between the average speed and a speed of the at least two feature points related to the frame.

4. The method of claim 2, wherein the common feature comprises a feature point, the method further comprising:
   determining a first score for each of the plurality of frames, the first score being negatively correlated to respective moving speeds of the feature point related to each of the plurality of frames.

5. The method of claim 4, further comprising:
   determining the plurality of frames to be consecutive frames associated with a zoom-in operation or a zoom-out operation; and
   determining a second score for each of the plurality of frames, the second score being positively correlated to a degree of the zoom-in operation or the zoom-out operation.

6. The method of claim 5, further comprising:
   determining a third score for each of the plurality of frames, the third score being positively correlated to an aesthetics measurement of each of the plurality of frames.

7. The method of claim 6, further comprising:
   determining a fourth score for each of the plurality of frames, the fourth score being correlated to a measurement of noise, brightness, or contrast of each of the plurality of frames.

8. The method of claim 7, further comprising:
   determining a weighted score for each of the plurality of frames based on at least two scores from the first score, the second score, the third score, and the fourth score; and
   determining the frame having a highest weighted score among the plurality of frames.

9. The method of claim 8, further comprising:
   training a neural network to automatically assign weights to the first score, the second score, the third score, or the fourth score based at least in part on user feedback; and
   determining respective weights for the at least two scores based on the neural network.

10. One or more non-transitory computer storage devices comprising computer-implemented instructions that, when used by one or more computing devices, cause the one or more computing devices to:
    grouping a plurality of frames in a video based at least in part on a common feature shared by the plurality of frames;
    determine respective motion characteristics of the common feature on respective frames of the plurality of frames; and
    transform at least one frame from the plurality of frames to a page in a document based at least in part on a motion characteristic of the common feature on the at least one frame.

11. The one or more computer storage devices of claim 10, wherein the common feature comprises a plurality of feature points, the instructions further cause the one or more computing devices to:
    determine the motion characteristic of the common feature on the at least one frame based at least in part on a sum of respective displacements of the plurality of feature points over two frames.

12. The one or more computer storage devices of claim 10, the instructions further cause the one or more computing devices to:
    detect a zoom-in or zoom-out operation within the plurality of frames based at least in part on a change in size of the common feature in the plurality of frames; and
    select the at least one frame based at least in part on the change in size of the common feature.

13. The one or more computer storage devices of claim 10, the instructions further cause the one or more computing devices to:

select the at least one frame based at least in part on an amount of text recognized in the at least one frame.

14. The one or more computer storage devices of claim 10, the instructions further cause the one or more computing devices to:
   select the at least one frame based at least in part on a shakiness, brightness, or contrast of the at least one frame.

15. The one or more computer storage devices of claim 10, the instructions further cause the one or more computing devices to:
   select the at least one frame based at least in part on one or more aesthetic characteristics of the at least one frame.

16. The one more computer storage devices of claim 15, wherein the one or more aesthetic characteristics comprises a measurement of depth of field or color vividness.

17. A system for video based document scanning, comprising:
   means for associating a plurality of frames in a video based at least in part on a common feature;
   means for determining respectively quality characteristics of each of the plurality of frames; and
   means for selecting a frame from the plurality of frames to convert into a file in a portable document format based at least in part on a weighted score related to at least two quality characteristics of the frame, the weighted score including a first score negatively correlated to a moving speed of a feature point of the common feature.

18. The system of claim 17, wherein the moving speed of the feature point is measured based on a displacement of the feature point in two adjacent frames of the plurality of frames.

19. The system of claim 17, wherein the respective quality characteristics comprises a zoom-in feature or a zoom-out feature; and wherein the weighted score is based at least in part on a second score positively correlated to a degree of the zoom-in feature or the zoom-out feature.

20. The system of claim 17, wherein the respective quality characteristics comprises an optical character recognition feature; and wherein the weighted score is based at least in part on a third score positively correlated to an amount of text recognized in relation to the optical character recognition feature.

* * * * *

UNITED STATES PATENT AND TRADEMARK OFFICE
CERTIFICATE OF CORRECTION

| | |
|---|---|
| PATENT NO. | : 10,819,876 B2 |
| APPLICATION NO. | : 16/017756 |
| DATED | : October 27, 2020 |
| INVENTOR(S) | : Ankit Pangasa et al. |

Page 1 of 1

It is certified that error appears in the above-identified patent and that said Letters Patent is hereby corrected as shown below:

In the Drawings

In sheet 4 of 5, FIG. 4, reference numeral 450, Line 1, delete "BLANCE" and insert -- BALANCE --, therefor.

In the Claims

In Column 15, Line 15, Claim 16, after "one" insert -- or --.

Signed and Sealed this
Twenty-ninth Day of December, 2020

Andrei Iancu
*Director of the United States Patent and Trademark Office*